United States Patent
Grunzke et al.

(10) Patent No.: US 9,671,855 B2
(45) Date of Patent: Jun. 6, 2017

(54) APPARATUSES AND METHODS OF ENTERING UNSELECTED MEMORIES INTO A DIFFERENT POWER MODE DURING MULTI-MEMORY OPERATION

(71) Applicant: Micron Technology, Inc., Boise, ID (US)

(72) Inventors: Terry M. Grunzke, Boise, ID (US); Ryan G. Fisher, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 146 days.

(21) Appl. No.: 14/319,302

(22) Filed: Jun. 30, 2014

(65) Prior Publication Data

US 2015/0378427 A1    Dec. 31, 2015

(51) Int. Cl.
G06F 1/26 (2006.01)
G06F 1/32 (2006.01)

(52) U.S. Cl.
CPC .......... G06F 1/3275 (2013.01); G06F 1/3203 (2013.01)

(58) Field of Classification Search
CPC .................................................. G06F 1/3275
USPC ...................................................... 713/320
See application file for complete search history.

(56) References Cited

U.S. PATENT DOCUMENTS

| | | | | |
|---|---|---|---|---|
| 4,603,384 A * | 7/1986 | Brantingham | .......... | G06F 9/262 712/245 |
| 6,195,306 B1 * | 2/2001 | Horiguchi | ............. | G11C 5/063 365/226 |
| 7,836,263 B2 * | 11/2010 | Fukushige | ............. | G11C 16/10 711/157 |
| 2004/0057317 A1 * | 3/2004 | Schaefer | .................. | G11C 8/12 365/222 |
| 2005/0071600 A1 * | 3/2005 | Bungo | ................ | G06F 12/0669 711/170 |
| 2008/0155204 A1 * | 6/2008 | Qawami | ............. | G06F 13/4234 711/149 |
| 2008/0155287 A1 * | 6/2008 | Sundaram | .............. | G11C 16/30 713/322 |
| 2008/0195875 A1 * | 8/2008 | Hobson | ................. | G06F 1/3203 713/320 |
| 2008/0247258 A1 * | 10/2008 | Watanabe | ................ | G11C 5/14 365/227 |
| 2009/0164722 A1 * | 6/2009 | Lee | ........................ | G06F 13/387 711/115 |
| 2010/0103759 A1 * | 4/2010 | Ouyang | ................. | G11C 5/147 365/226 |
| 2011/0219248 A1 * | 9/2011 | Cho | .......................... | G06F 1/32 713/323 |
| 2013/0301372 A1 * | 11/2013 | Park | ......................... | G11C 5/14 365/227 |
| 2015/0009773 A1 | 1/2015 | Grunzke | | |
| 2015/0058643 A1 * | 2/2015 | Lai | ........................ | G06F 1/3287 713/310 |

* cited by examiner

Primary Examiner — Jaweed A Abbaszadeh
Assistant Examiner — Volvick Derose
(74) *Attorney, Agent, or Firm* — Dorsey & Whitney LLP

(57) ABSTRACT

Disclosed are examples of apparatuses including memory devices and systems comprising memories sharing a common enable signal, wherein the memories may be put into different power modes. Example methods for setting the different power modes of the memories are disclosed. In some examples, different power modes may be set by issuing memory group-level commands, memory-level commands, or combinations thereof.

29 Claims, 9 Drawing Sheets

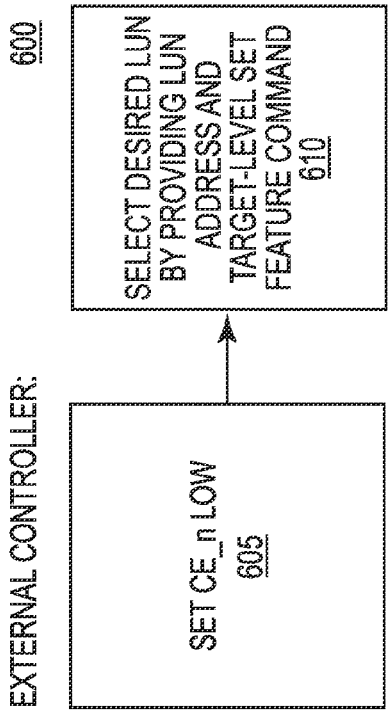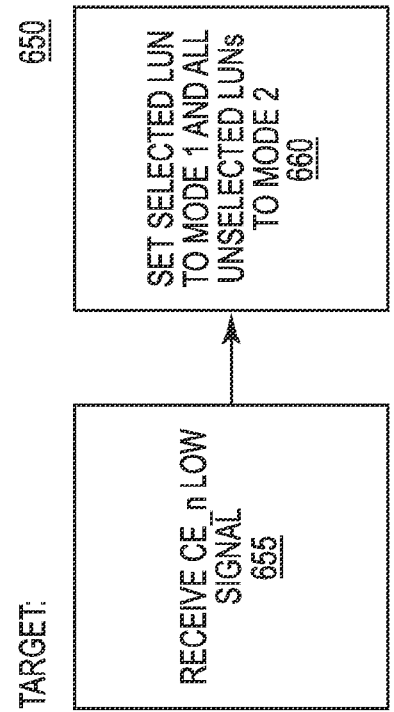

APPARATUSES AND METHODS OF ENTERING UNSELECTED MEMORIES INTO A DIFFERENT POWER MODE DURING MULTI-MEMORY OPERATION

BACKGROUND

Memory systems may include a plurality of discrete memory devices. Each memory device may include multiple memories. In some systems, the individual memories may be referred to as logical units (LUNs). The LUNs may be organized into memory groups, where each LUN belonging to a memory group receives a common chip enable CE signal. Each memory group may contain one or more LUNs. The common CE signal may be utilized to save layout area and reduce circuit complexity in the memory system by avoiding the need for providing (as used herein, "providing" refers to, for example, generating, issuing, passing, sending, transmitting and the like) separate CE signals to each of the LUNs of a memory group.

A memory controller in the memory system (which may be external to or internal to the memory device) may use command and address signals provided to the memory devices to command the discrete memories to perform memory operations. Memory operations may include read operations for reading stored data from the memories, as well as write operations for writing data to the memories to be stored. The memory controller typically selects a desired LUN in a desired memory group to perform a memory operation, such as reading or writing data to a selected LUN. The memory controller may provide a logic level low CE signal to the desired memory group to activate the LUNs of the memory group. The LUNs may enter an elevated power mode that readies the LUNs to perform a memory operation. Although one of the LUNs will typically be commanded to perform the memory operation, the shared CE signal results in all LUNs in the memory group entering an elevated power mode that draws an increased current compared to a low power mode.

While the unselected LUNs in the memory group may not be performing memory operations, the current drawn by the memory group is nonetheless additive across all of the unselected LUNs, which results in significant power consumption by a memory group. In configurations having memory groups with a high number of LUNs, the power consumption for activating all of the LUNs of the memory group for a memory operation relative to merely one of the LUNs may be significant.

BRIEF DESCRIPTION OF THE DRAWINGS

FIG. 6A is a block diagram of a further method performed by a memory controller according to an embodiment of the invention.

FIG. 6B is a block diagram of a further method performed by a memory group according to an embodiment of the invention.

DETAILED DESCRIPTION

Certain details are set forth below to provide a sufficient understanding of embodiments of the disclosure. However, it will be clear to one having skill in the art that embodiments of the disclosure may be practiced without these particular details. Moreover, the particular embodiments of the present disclosure described herein are provided by way of example and should not be used to limit the scope of the disclosure to these particular embodiments. In other instances, well-known circuits, control signals, timing protocols, and software operations have not been shown in detail in order to avoid unnecessarily obscuring the disclosure. As used herein, apparatus may refer to, for example, an integrated circuit, a memory, a memory device, a memory system, an electronic device or system, a smart phone, a tablet, a computer, a server, etc.

Figure 1:
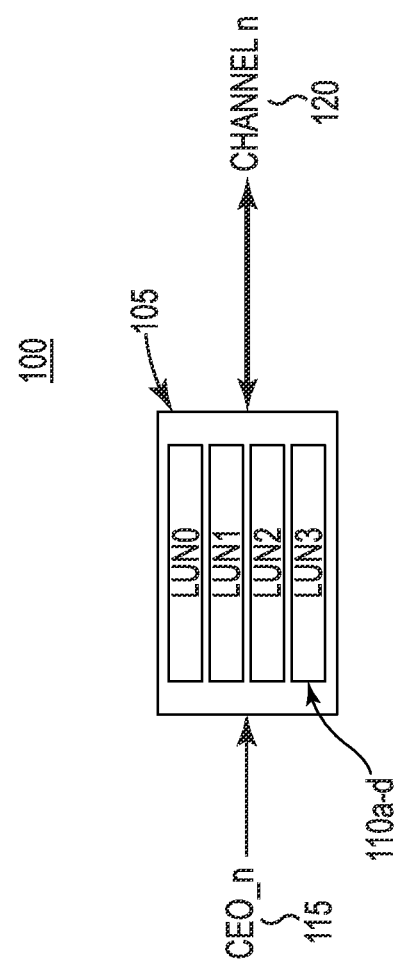
FIG. 1 is a block diagram of a memory device according to an embodiment of the invention.

FIG. 1 illustrates a memory device 100 that includes a memory group 105. The memory group 105 includes four memories 110a-d, labeled as logical units (LUN0-3). Although four LUNs are shown, more or fewer LUNs may be included in the memory group. The memory group 105 receives a chip enable CE signal 115 labeled as CE0_n. The CE signal is provided to all of the LUNs 110a-d in the memory group 105. In other words, it is a common CE signal. The memory group 105 further includes a communication channel 120, labeled as Channel n. The communication channel 120 may be a data bus, which may be used for receiving commands and addresses, receiving data, and sending data. Other signals may also be provided or received by the memory group 105 through the communication channel 120. In some embodiments, the memory group 105 may include additional communication channels. Although the memory device 100 is shown with one memory group 105, the memory device 100 may include a plurality of memory groups. If the memory device 100 comprises a plurality of memory groups, the memory device 100 may receive a different CE signal for each memory group, and each memory group may have a corresponding communication channel.

In some embodiments, when the CE signal 115 is set to a logic level high (e.g., the CE signal is inactive), the memory group 105 may be disabled, that is, all LUNs 110a-d may be in a first (e.g., low power) mode, referred to as Mode 0. In Mode 0, the LUNs are not at the ready to perform a memory operation, for example, the LUNs may not be able to receive a signal on the communication channel 120. During the first power mode, circuits of the LUNs may be disabled, for example, various input and output circuits, timing circuits, memory array circuits, etc. The first power mode Mode 0 may correspond to a standby mode of operation in some embodiments. When the CE signal 115 is set to a logic level low (e.g., the CE signal is active), the memory group 105 may be enabled and are at the ready to perform a memory operation, for example, receive commands and address signals on communication channel 120 indicating the desired LUN to be selected for a memory operation. For example, say LUN2 110c is selected. LUN2 110c transitions to second (e.g., increased power) mode, referred to as Mode 1. In Mode 1, LUN2 110c is capable of receiving commands on communication channel 120. During the second power mode, circuits of the LUNs are enabled and at the ready for operation, for example, input and output circuits, timing circuits, memory array circuits, etc. are all enabled. The second power mode Mode 1 may correspond to an active mode of operation in some embodiments.

The unselected LUNs (LUN0, LUN1, LUN3) may be transitioned into a third (e.g., an intermediate or low power) mode, referred to as Mode 2. Although the third power mode could be a different power mode than, for example, the first power mode, in at least some embodiments. The first and third power modes might be the same power mode (e.g., a standby mode). In one example of a third power mode, a certain subset of circuits may be enabled on the LUN. For example, various ones of the input and output circuits, timing circuits, memory array circuits, etc. are enabled, but the LUN may not be capable of executing all commands. During the third power mode, a portion of the circuits enabled during the second power mode, are not enabled, thereby consuming less power during the third power mode relative to the second power mode. The third power mode Mode 2 may correspond to an intermediate mode of operation in some embodiments. For example, in some embodiments, Mode 2 draws more current than Mode 0, but less than Mode 1. An advantage of the unselected LUNs transitioning to a third power mode may be a lower current requirement for the memory group 105 than if all of the LUNs in the enabled memory group entered Mode 1. Furthermore, the time latency of re-enabling unselected LUNs may be less in Mode 2 than in the first power mode, Mode 0. This may improve performance when various LUN on the same memory group are selected sequentially while the CE signal remains low. Methods of transitioning the LUNs into the desired power modes will be described in more detail below.

Figure 2:
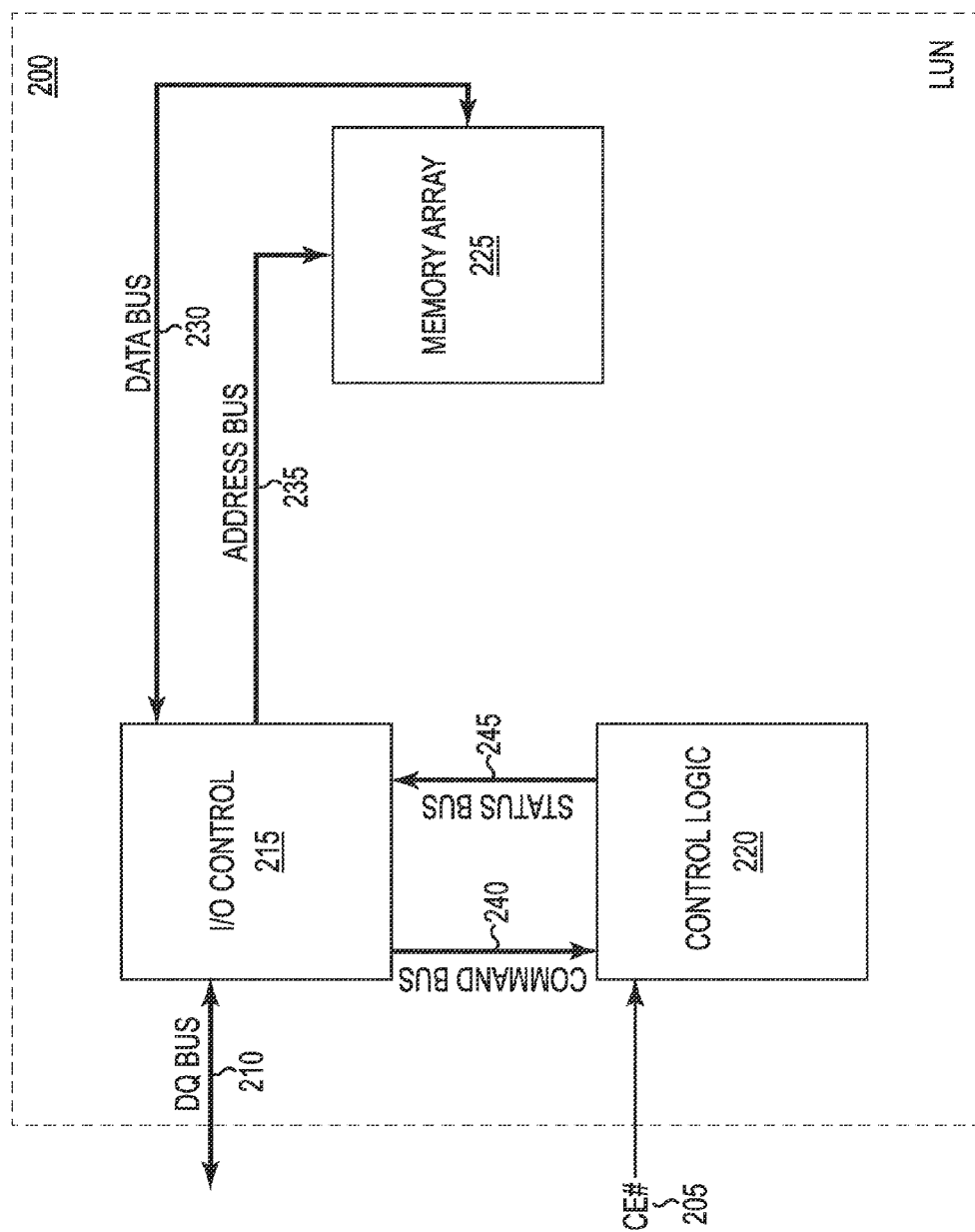
FIG. 2 is a block diagram of a logical unit according to an embodiment of the invention.

FIG. 2 illustrates a LUN 200 that may be included in a memory group such as memory group 105 illustrated in FIG. 1. The LUN 200 may include an input-output controller 215. The input-output controller 215 may be coupled to a data (DQ) bus 210. The input-output controller 215 may receive data, address, and command signals via the DQ bus 210. The DQ bus 210 may correspond to the communication channel 120 in FIG. 1. The input-output controller 215 may provide memory address signals to a memory array 225 via an address bus 235. The memory address signals are decoded to identify the memory location of the memory array 225 for the memory operation. The memory array 225 may provide data to and receive data from the input-output controller 215 via a data bus 230. The input-output controller 215 may provide command signals to control logic 220 via a command bus 240. The control logic 220 may provide internal control signals to the circuits of the LUN 200 to perform the memory operation. The control logic 220 may further provide status signals to the input-output controller 215 via a status bus 245. The control logic 220 may receive a chip enable signal 205 to control activation of the LUN 200. The chip enable signal 205 may correspond to the common enable signal 115 in FIG. 1. Although not shown, the control logic 220 may also receive command latch enable signals, read enable signals, write enable signals, and/or additional signals. These signals may or may not be shared with other LUNS that are included in the memory group that contains LUN 200. In some embodiments, the I/O controller 215 may be disabled from receiving input from DQ bus 210 and/or the control logic 220 may be disabled from receiving commands from the input-output controller 215 when the LUN is in certain power modes, for example, the first power mode, Mode 0.

Figure 3:
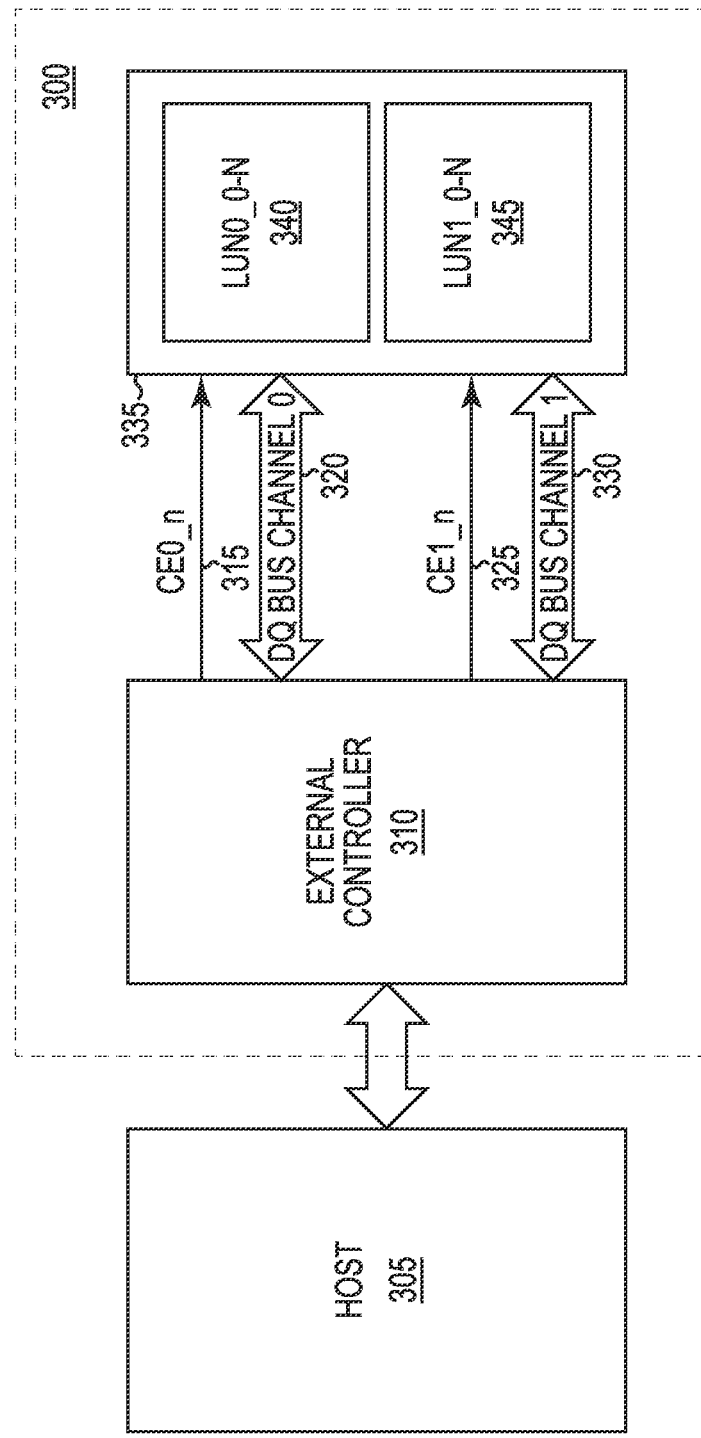
FIG. 3 is a block diagram of a memory system according to an embodiment of the invention.

FIG. 3 illustrates a memory system 300 connected to a host 305. The host may be a laptop computer, personal computer, digital camera, mobile telephone, or other electronic device. The host 305 may interface with the memory system 300 via a serial advanced technology attachment (SATA), peripheral component interconnect express (PCIe), a universal serial bus (USB), or other interface. The memory system 300 may receive command signals from the host 305, and the memory system 300 may provide data signals and/or other signals to the host 305. The memory system 300 may include a memory controller 310 and a memory device 335. The controller 310 may be configured to provide signals to the memory device 335 to control its operation based on the command, address, data, and/or other signals received by the memory system 300 from the host 305. Although depicted in this embodiment as being external to the memory device 335, in other embodiments the controller 310 might be at least partially internal to the memory device. The memory device may include two memory groups 340, 345. Each memory group 340, 345 may include one or more memories (LUN_0-N). Although two memory groups are shown, the memory device 335 may include more or fewer memory groups. Likewise, while the memory system 300 is shown including memory device 335, additional memory devices may be included in the memory system 300 as well. The controller 310 may control the state of chip enable signals 315, 325 received by the memory device 335. The number of chip enable signals may correspond to the number of memory groups included in the memory device 335. The controller 310 and memory device 335 may pass address, data, and command signals via data buses 320, 330. Each data bus 320, 330 may correspond to a memory group 340, 345 included in the memory device 335. The data buses 320, 330 may correspond to respective communication channels for the memory groups 340, 345. In some embodiments, the controller 310 and memory device 335 may pass signals via a single data bus. Although only one memory device 335 is shown, the controller 310 may control multiple memory devices within the memory system 300.

Figure 4A:
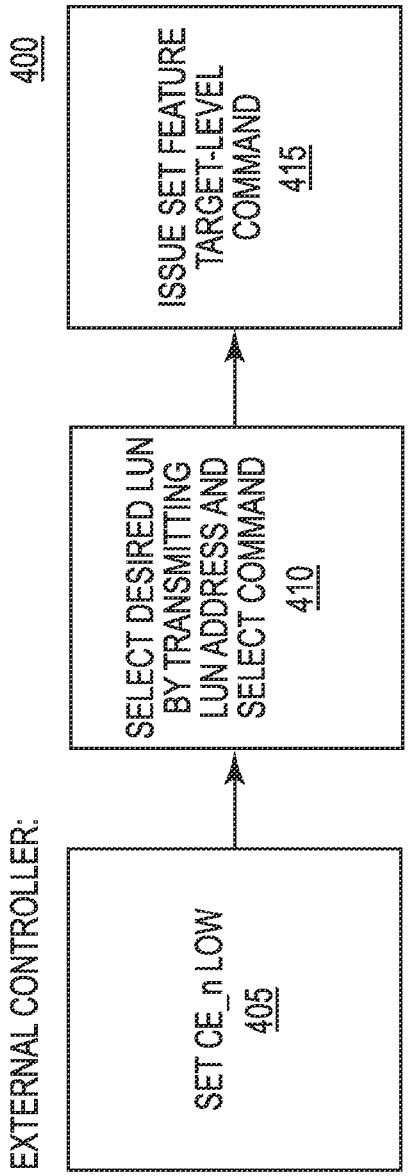
FIG. 4A is a block diagram of a method performed by a memory controller according to an embodiment of the invention.
Figure 4B:
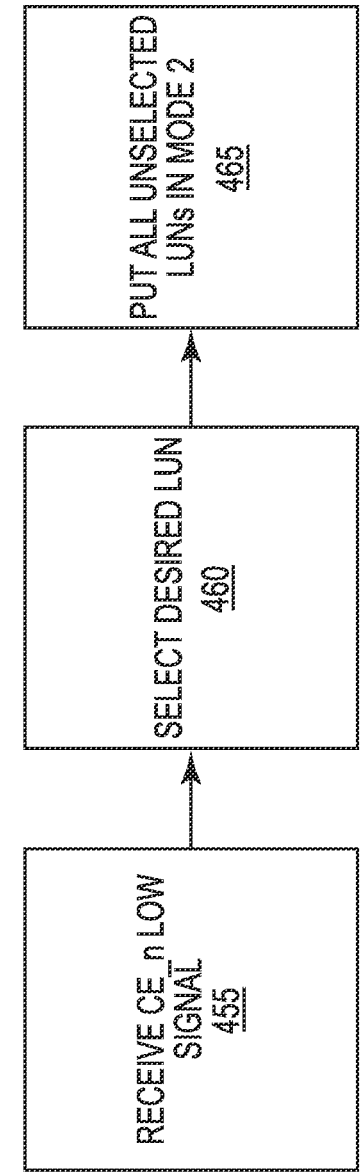
FIG. 4B is a block diagram of a method performed by a memory group according to an embodiment of the invention.

The controller may transition the LUNs to the desired power mode responsive to selection of a memory group. FIG. 4A illustrates a process 400 performed by a controller, for example, the external controller 310, according to an embodiment of the invention. FIG. 4B illustrates a process 450 performed by the selected memory group, for example, memory group 340 or memory group 345, according to an embodiment of the invention. The controller may set the common chip enable signal, for example CE0_n 315, for the selected memory group to a logic level low at step 405. Once the common CE signal is set to logic level low, the controller selects a desired LUN from the plurality of LUNs on the memory group by providing the address of the LUN and a command for selecting the LUN at step 410. Any appropriate LUN addressing system known in the art may be used. After sending the select command, the controller then issues a memory group-level set feature command at step 415. A memory group-level command is issued to all LUNs in a memory group, however, the memory group-level command sent at step 415 may designate the power mode for the unselected LUNs.

Figure 4C:
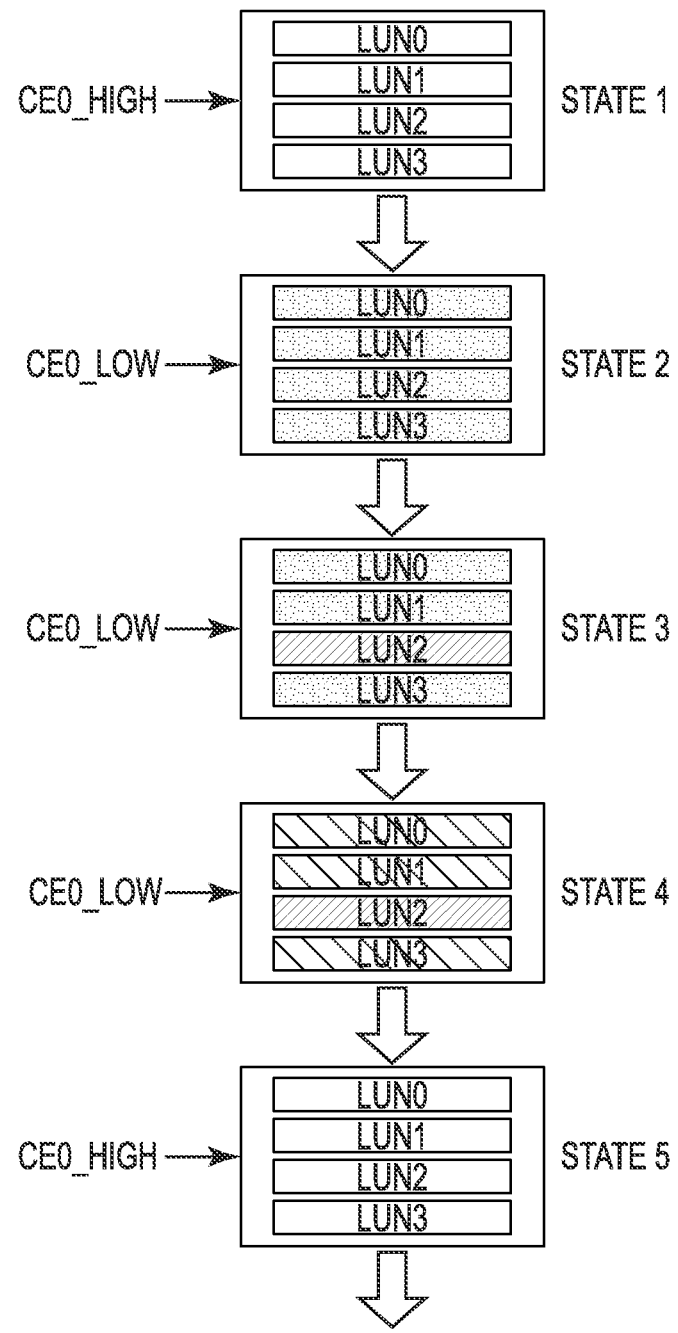
FIG. 4C is a block diagram of power modes of a logical units in different states according to an embodiment of the invention.

With reference to FIG. 4B, the memory group, such as memory group 340 in FIG. 3 or memory group 105 in FIG. 1, receives the logic level low common chip enable, such as CE0_n 315 or CE0_n 115, at step 455, which puts the LUNs of the memory group into a second power mode, Mode 1, as illustrated in State 2 in FIG. 4C. Prior to receiving the logic level low CE signal, the LUNs of the memory group may be in a first power mode Mode 0, for example. This is illustrated in State 1 in FIG. 4C. In Mode 1, the LUNs may be ready to perform a memory operation. The memory group receives the select command and address from the controller and the desired LUN may be selected at step 460. In some embodiments, the select command may be received by an input-output controller, for example, the input-output controller 215 in FIG. 2. The select command may be executed by control logic in the LUN, for example, control logic 220 in FIG. 2. This is illustrated in State 3 in FIG. 4C. In this example, LUN2 is selected. When the memory group-level command is received, all unselected LUNs may be put into a different power mode, such as a third power mode Mode 2 at step 465, as illustrated in State 4 in FIG. 4C. This method may take two address-command sequences to complete: one sequence to select a selected LUN, and another sequence to put the unselected LUNs into a different power mode. When the controller sets the CE signal for the selected memory group to a logic level high, all LUNs may return to Mode 0, as illustrated in State 5 in FIG. 4C. In some embodiments State 1 and State 5 are equivalent. For subsequent memory operations by the memory group, the controller sets the CE signal to a logic level low for the selected memory group, and select and memory group-level commands may be issued again by the controller to configure the power modes of the LUNs of the selected memory group.

Figure 5A:
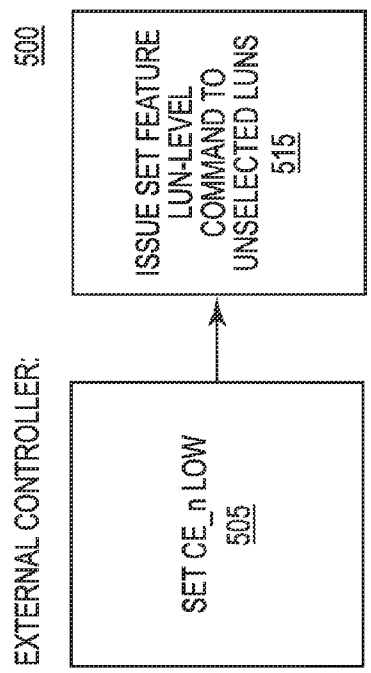
FIG. 5A is a block diagram of an additional method performed by a memory controller according to an embodiment of the invention.
Figure 5B:
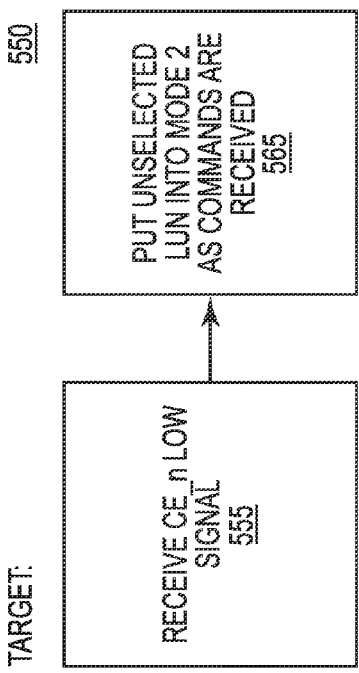
FIG. 5B is a block diagram of an additional method performed by a memory group according to an embodiment of the invention.

FIG. 5A illustrates a process 500 performed by the controller according to another embodiment of the invention. The controller may be external controller 310 in some embodiments. FIG. 5B illustrates a process 550 performed by the selected memory group, for example, memory group 340 or memory group 345, according to another embodiment of the invention. The controller may set the common chip enable signal for the selected memory group to a logic level low at step 505, the chip enable signal may be CE0_n 315 or CE0_n 115 in some embodiments. Once the common CE signal is set to logic level low, the controller provides sequentially, in other words, one at a time, individual LUN-level (rather than memory group-level) set feature commands and addresses to each unselected LUN at step 515. In contrast to processes 400 and 450 illustrated by FIGS. 4A and 4B, the controller may provide sequentially, individual LUN-level set feature commands to each unselected LUN at step 515. Each LUN-level command may have an associated address designating the particular unselected LUN.

With reference to FIG. 5B, the memory group receives the logic level low common chip enable at step 555, which puts the LUNs of the memory group into a second power mode Mode 1. Prior to receiving the logic level low CE signal, the LUNs of the memory group may be in a first power mode Mode 0, for example. The memory group then receives the individual LUN-level set feature commands and addresses from the controller. Each unselected LUN is put into a desired power mode, such as a third power mode Mode 2, as each individual LUN-level command is received at step 565.

Figure 5C:
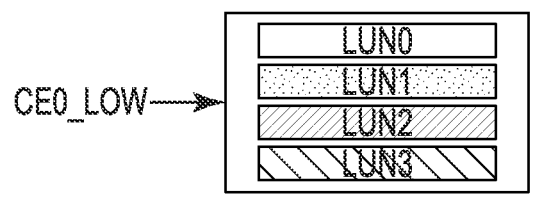
FIG. 5C is a block diagram of power modes of a logical unit according to an embodiment of the invention.

In some embodiments, the individual LUN-level commands may be received by an input-output controller, for example, the input-output controller 215 in FIG. 2. The individual LUN-level commands may be executed by control logic in the LUN, for example, control logic 220 in FIG. 2. This method may take a plurality of address-command sequences to complete, based at least in part, on the number of unselected LUNs in the memory group. However, this method may provide flexibility to put each of the unselected LUNs into a respective power mode. For example, rather than putting all unselected LUNs into Mode 2, it may be desirable for unselected LUNs to be put into Mode 0 and/or Mode 1, or some other power mode. FIG. 5C illustrates an example of a memory group having LUNs in a variety of power modes. In this example, LUN2 is selected, LUN0 in Mode 0, LUN1 in Mode 1, and LUN3 in Mode 2. When the controller sets the CE signal for the selected memory group to a logic level high, all LUNs may return to Mode 0. For subsequent memory operations by the memory group, the controller sets the CE signal to a logic level low for the selected memory group, and individual LUN-level commands may be issued again by the controller to configure the power modes of the LUNs of the selected memory group.

FIG. 6A illustrates a process 600 performed by the controller for example, the external controller 310, according to another embodiment of the invention. FIG. 6B illustrates a process 650 performed by the selected memory group, for example, memory group 340 or memory group 345, according to an embodiment of the invention. The controller may set the common chip enable signal for the selected memory group to a logic level low at step 605. The controller may then provide a memory group-level set feature command and the address of the selected LUN at step 610. The memory group-level set feature command may designate the desired power modes of all LUNs in the memory group. The memory group-level set feature command provided by the controller may designate the address of the memory group, an indication that a memory group-level command is being provided, followed by a set of sub-feature parameters. The sub-feature parameters may provide the address of each LUN in the memory group followed by the desired sub-feature setting, for example, selection status, power mode, or other memory operation setting. In some embodiments, the individual LUN addresses may not be provided in the memory group-level set feature command, and the order that the sub-feature parameters are provided to the memory group designate which LUN corresponds to the provided sub-feature parameter.

With reference to FIG. 6B, the memory group receives the logic level low common chip enable, for example, the chip enable signal may be CE0_n 315 or CE0_n 115, in some embodiments at step 655, which puts the LUNs of the memory group into a second power mode Mode 1. Prior to receiving the logic level low CE signal, the LUNs of the memory group may be in a first mode Mode 0, for example. The memory group then receives the memory group-level set feature command at step 660 and sets the selected LUN to Mode 1 and the unselected LUNs to the desired power modes, for example, Mode 2, based, at least in part, on the sub-feature parameter provided by the memory group-level command for each respective LUN. The unselected LUNs may all be set to the same power mode or may be set different power modes, similar to the state illustrated in FIG. 5C. In some embodiments, the memory group-level command may be received by an input-output controller, for example, the input-output controller 215 in FIG. 2. The memory group-level command may be executed by control logic in the LUN, for example, control logic 220 in FIG. 2. This method may take one address-command sequence to execute. When the controller sets the CE signal for the selected memory group to a logic level high, all LUNs may return to Mode 0. For subsequent memory operations by the memory group, the controller sets the CE signal to a logic level low for the selected memory group, and a group-level command and address of a selected LUN may be issued again by the controller to configure the power modes of the LUNs of the selected memory group.

The methods described above are exemplary, and other methods of setting the power modes of the LUNs may be possible. Furthermore, additional power modes may also be possible. For example, a power mode that has a current draw between Mode 1 and Mode 2 may be configured. This mode, referred to as Mode 3 may allow a LUN to sniff a data bus. Mode 3 may be desirable when a LUN is designated as a memory group terminator for on-die termination applications.

Figure 7:
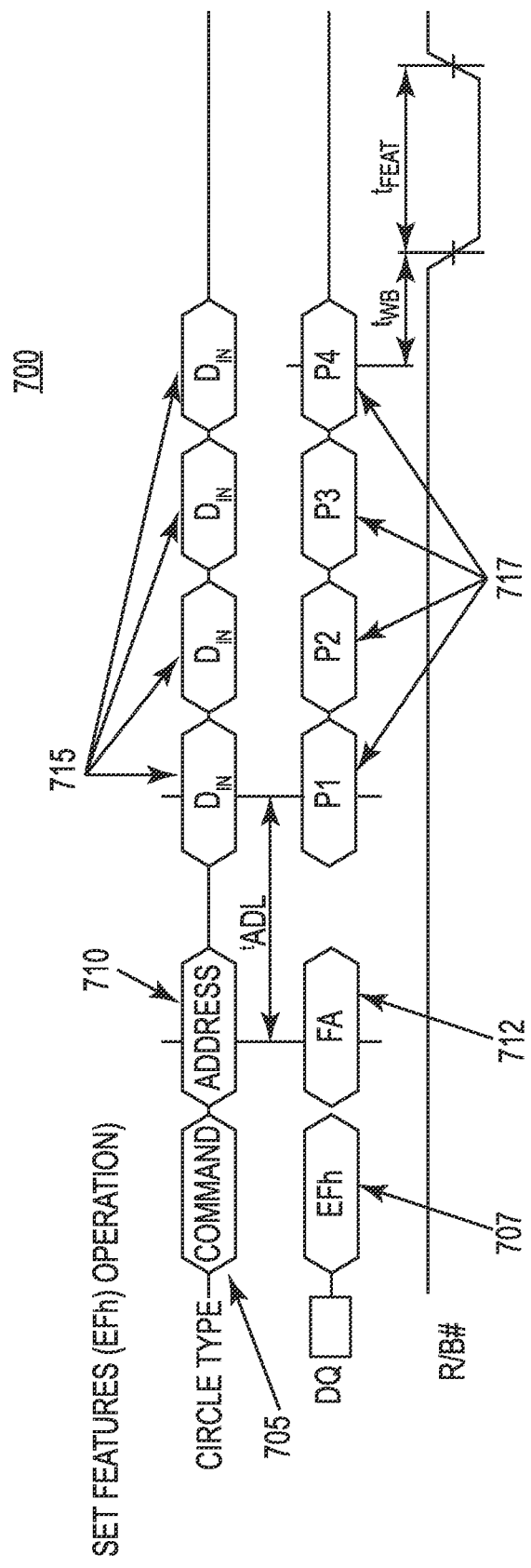
FIG. 7 is a block diagram of a set feature command according to an embodiment of the invention.

FIG. 7 illustrates various signals during a memory group-level set-feature command according to an embodiment of the invention. The memory group-level set-feature command may be provided by a controller, such as external controller 310 in FIG. 3. The set-feature command 705 is followed by the desired feature 710. An op-code 707 corresponding to the set-feature command 705 and a feature code 712 corresponding to the desired feature 710 are provided on a data bus DQ, which may correspond to data bus 210 in FIG. 2 in some embodiments. The set-feature command 705 may indicate to the memory group, for example memory group 340 or 345 in FIG. 3, that the following feature 710 is to be applied to the entire memory group, not an individual LUN. The set-feature command 705 and feature 710 are then followed by one or more sub-feature parameters 715. Codes 717 corresponding to the sub-feature parameters 715 are provided on the data bus DQ. These sub-feature parameters 715 may define the desired configuration of the LUNs in the memory group, such as LUN0_0-N 340 in FIG. 3. Configurations may include power modes, but other features may also be defined by the sub-feature parameters 715. A ready/busy (R/B#) signal is provided by the memory device to indicate that the memory device is busy while the features are being set. The R/B# signal returns to a logic level high upon completion of being set. In some embodiments, the R/B# signal may be provided by control logic, for example, control logic 220 in FIG. 2. Other command-address protocols may be used in other embodiments.

Those of ordinary skill would further appreciate that the various illustrative logical blocks, configurations, modules, circuits, and algorithm steps described in connection with the embodiments disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends on the particular application and design constraints imposed on the overall system. Skilled artisans may implement the described functionality in varying ways for each particular application, but such implementation decisions should not be interpreted as causing a departure from the scope of the present disclosure.

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. An apparatus, comprising:
a first memory; and
a second memory, wherein the first and the second memory share a common enable signal, and wherein the second memory is configured to enter into a different power mode than the first memory responsive to a command designating a power mode of the second memory and the first memory being selected, wherein the first and second memories are configured to transition from a first power mode to a second power mode responsive to activation of the common enable signal, and wherein the second memory is configured to transition from the second power mode to a third power mode responsive to the command designating the third power mode.

2. The apparatus of claim 1, further comprising a controller configured to set the power modes of the first and second memories.

3. The apparatus of claim 2, wherein the controller is further configured to set the common enable signal.

4. The apparatus of claim 1, wherein the second power mode of the first memory is greater relative to the third mode of the second memory.

5. The apparatus of claim 1, wherein the second memory comprises:
an input-output controller; and
control logic configured to receive the common enable signal, wherein the control logic is further configured to receive commands from the input-output controller and provide internal control signals responsive to the commands from the input-output controller.

6. The apparatus of claim 1, wherein the first and second memories are included in a memory group of a plurality f memory groups, and further comprising:
a host; and
a controller coupled to the host and to the plurality of memory groups, wherein the controller is configured to control a mode of operation of the memories of the memory group responsive to command signals received from the host.

7. The apparatus of claim 6, wherein the plurality of memory groups are included in a memory device that is external to the controller.

8. The apparatus of claim 6, further comprising a plurality of communication channels, each communication channel of the plurality of communication channels coupled to a respective one of the plurality of memory groups.

9. The apparatus of claim 6, wherein the controller is configured to provide a respective enable signal to each memory group of the plurality of memory groups, wherein the plurality of memories of a memory group are provided the same respective enable signal.

10. The apparatus of claim 1, wherein the first and third power modes are different.

11. The apparatus of claim 10, wherein the first power mode is a low power mode, the second power mode is an increased power mode and the third power mode is an intermediate power mode.

12. The apparatus of claim 1, wherein the first and third power modes are the same.

13. The apparatus of claim 12, wherein the first and third power modes comprise a stand-by power mode.

14. A method, comprising:
receiving an active enable signal at a memory group, wherein the memory group includes a plurality of memories;
responsive to the active enable signal, putting the plurality of memories of the memory group into a first mode of operation;
receiving a select command at the memory group to select a selected memory of the plurality of memories for a memory operation;
receiving a group-level command at the memory group; and
responsive to the group-level command putting unselected memories of the memory of the plurality of memories of the memory group into a second mode of operation;
wherein putting the plurality of memories of the memory group into a first mode of operation comprises transitioning all of the plurality of memories of the memory group from a third mode of operation to the first mode of operation.

15. The method of claim 14, wherein the second and third modes of operation are the same mode of operation.

16. The method of claim 14, wherein the second and third modes of operation are different modes of operation.

17. The method of claim 14, wherein prior to receiving the active enable signal, the plurality of memories of the memory group are in a standby mode of operation.

18. The method of claim 14, wherein putting a memory of the plurality of memories of the memory group into the second mode of operation comprises putting all of the memories of the memory group into the second mode of operation, except the selected memory of the plurality' of memories of the memory' group.

19. The method of claim 14, wherein putting e plurality of memories of the memory group into a first mode of operation comprises enabling a plurality of input-output circuits of the plurality of memories of the memory group, and wherein putting a memory of the plurality of memories of the memory group into a second mode of operation comprises disabling at least a portion of the plurality of input-output circuits of the plurality of memories of the memory group.

20. A method, comprising:
receiving an active enable signal at a memory group, wherein the memory group includes a plurality of memories;
receiving separate commands at the memory group for each of the plurality of memories of the memory group except a selected memory from the plurality of memories of the memory group; and
responsive to the active enable signal, putting the plurality of memories of the memory group into a first power mode;
responsive to the separate commands for each of the plurality of memories, except the selected memory, putting each of the plurality of memories except the selected memory into a respective second power mode;
wherein putting the plurality of memories of the memory group into a first power mode comprises transitioning all of the plurality of memories of the memory group from a third power mode to the first power mode, and
wherein each of the separate commands includes an address associated with a respective memory of the plurality of memories and a setting for the respective memory of the plurality of memories.

21. The method of claim 20, wherein the respective second power mode for each of the plurality of memories is different.

22. The method of claim 20, wherein the respective second power mode for at least one of the plurality of memories allows the at least one of the plurality of memories a memory to sniff a data bus.

23. The method of claim 20, wherein the separate commands are received sequentially.

24. A method, comprising:
enabling all the memories of a plurality of memories, the plurality of memories included in a memory group, wherein all the memories of the plurality of memories are put in a second power mode from a first power mode responsive to being enabled;
receiving a group-level feature command at the memory group, wherein the group-level feature command includes a set of sub-feature parameters, the set of sub-feature parameters including a respective sub-feature setting for each memory of the plurality of memories; and
responsive to the group-level feature command:
receiving at a selected memory of the plurality of memories of the memory group a respective sub-feature setting to set the selected memory of the plurality of memories of the memory group to a selected status; and
putting each unselected memory of the plurality of memories into a respective desired power mode according to the respective sub-feature setting of the sub-feature parameters;
wherein the respective desired power mode is selected from a group comprising a first power mode, a second power mode, and a third power mode, and wherein the first power mode, the second power mode, and the third power mode are different from each other.

25. The method of claim 24, wherein the command designates the desired power modes.

26. The method of claim 25, wherein the address further designates an address of each memory of the memory group.

27. The method of claim 24, further comprising configuring the selected memory to receive and execute a command.

28. The method of claim 24, further comprising receiving an active enable signal at the memory group.

29. The method of claim 28, further comprising receiving an inactive enable signal at the memory group; and
responsive to receiving the inactive enable signal:
putting each of the plurality of memories into a lower power mode.

* * * * *